(12) United States Patent
Melo et al.

(10) Patent No.: US 11,536,140 B2
(45) Date of Patent: Dec. 27, 2022

(54) STIFFENED TORQUE TUBE FOR GAS TURBINE ENGINE

(71) Applicant: Mitsubishi Power Americas, Inc., Lake Mary, FL (US)

(72) Inventors: Antonio Melo, Lake Mary, FL (US); Noah Rowe, Orlando, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 17/474,429

(22) Filed: Sep. 14, 2021

(65) Prior Publication Data

US 2021/0404341 A1    Dec. 30, 2021

Related U.S. Application Data

(62) Division of application No. 16/413,889, filed on May 16, 2019, now Pat. No. 11,156,091.

(51) Int. Cl.
*F01D 5/02* (2006.01)
*F01D 5/06* (2006.01)

(52) U.S. Cl.
CPC .............. *F01D 5/025* (2013.01); *F01D 5/026* (2013.01); *F01D 5/066* (2013.01); *F05D 2220/32* (2013.01); *F05D 2260/31* (2013.01); *F05D 2260/941* (2013.01)

(58) Field of Classification Search
CPC ................................. F01D 5/025; F01D 5/066
See application file for complete search history.

(56) References Cited

U.S. PATENT DOCUMENTS

| 4,870,818 | A | 10/1989 | Suliga |
| 5,951,250 | A | 9/1999 | Suenaga et al. |
| 6,151,881 | A | 11/2000 | Ai et al. |
| 8,465,259 | B2 | 6/2013 | Light et al. |
| 9,556,737 | B2 * | 1/2017 | Janarthanan ............. F01D 5/08 |
| 9,598,961 | B2 | 3/2017 | Gurao et al. |
| 9,631,513 | B2 | 4/2017 | Chehab |

(Continued)

OTHER PUBLICATIONS

"U.S. Appl. No. 16/413,889, Final Office Action dated Mar. 30, 2021", 12 pgs.

(Continued)

*Primary Examiner* — Michael L Sehn
(74) *Attorney, Agent, or Firm* — Schwegman Lundberg & Woessner, P.A.

(57) ABSTRACT

A gas turbine engine rotor assembly comprises a torque tube, turbine stage and stiffening mass. The torque tube comprises a shaft extending from a forward location to an aft end, and a shaft fastening flange disposed at the aft end. The turbine stage comprises a disc, a disc adapter extending forward from the disc, and a disc fastening flange extending from the disc adapter and couplable to the shaft fastening flange at an interface. The stiffening mass is positioned proximate the interface to reduce operational stress in the torque tube. A method of reducing operational stress in a rotor assembly comprises de-stacking a rotor stack, separating a first stage rotor disc adapter from a torque tube, attaching a stiffening mass to an inner diameter of one or both of the disc adapter and the torque tube, attaching the disc adapter to the torque tube, and re-stacking the rotor stack.

20 Claims, 4 Drawing Sheets

(56) References Cited

U.S. PATENT DOCUMENTS

| 10,208,601 | B2 | 2/2019 | Nereim et al. |
| 11,156,091 | B2 | 10/2021 | Melo et al. |
| 2017/0122205 | A1 | 5/2017 | Ertas et al. |
| 2020/0362701 | A1 | 11/2020 | Melo et al. |

OTHER PUBLICATIONS

"U.S. Appl. No. 16/413,889, Non Final Office Action dated Sep. 17, 2020", 13 pgs.

"U.S. Appl. No. 16/413,889, Notice of Allowance dated Jun. 16, 2021", 8 pgs.

"U.S. Appl. No. 16/413,889, Response filed May 28, 2021 to Final Office Action dated Mar. 30, 2021", 13 pgs.

"U.S. Appl. No. 16/413,889, Response filed Aug. 6, 2020 to Restriction Requirement dated Jun. 19, 2020", 7 pgs.

"U.S. Appl. No. 16/413,889, Response filed Dec. 15, 2020 to Non Final Office Action dated Sep. 17, 2020", 14 pgs.

"U.S. Appl. No. 16/413,889, Restriction Requirement dated Jun. 19, 2020", 6 pgs.

U.S. Appl. No. 16/413,889, filed May 16, 2019, Stiffened Torque Tube for Gas Turbine Engine.

* cited by examiner

STIFFENED TORQUE TUBE FOR GAS TURBINE ENGINE

PRIORITY APPLICATIONS

This application is s a divisional application of U.S. patent application Ser. No. 16/413,889, filed May 16, 2019, the content of which is incorporated herein by reference in its entirety.

TECHNICAL FIELD

This document pertains generally, but not by way of limitation, to gas turbine engines. More specifically, but not by way of limitation, the present application relates to shafts and torque tubes, such as those that can be used to couple various rotating components, such as rotor discs of compressor and turbine assemblies.

BACKGROUND

In gas turbine engines, a plurality of simultaneously rotating components are assembled together as a single unit. In particular, a compressor stack is coupled to a turbine stack through a shaft, torque tube or shaft system using various coupling mechanisms, such as force-fits, splines and bolted connections. Shafts and torque tubes can be cylindrical such that space within the shaft can be used for other components, such as air, fuel and lubrication systems. Cycles of temperatures and forces generated by operation of the gas turbine engine can produce various stresses and strains within the components and the couplings therebetween. As such, gas turbine engine designers must balance the performance of the gas turbine engine with other factors, such as vibrations in the gas turbine engine itself and the air, fuel and lubrication systems located therein.

Examples of gas turbine engine couplings are described in U.S. Pat. No. 6,151,881 to Ai et al., U.S. Pat. No. 9,631,513 to Chehab; and U.S. Pat. No. 5,951,250 to Suenaga et al.

Overview

The present inventors have recognized that problems to be solved in gas turbine engines can include, among other things, stresses that arise near coupling flanges in rotating components, such as shafts and torque tubes. In particular, competing forces can arise between the need to bolt a torque tube to a turbine disc stack, which tends to put couplings in tension, and the need to bolt rotating components together, which tends to put couplings in compression. For example, a torque tube can be bolted to the turbine disc stack via a disc adapter. A bolt assembly between the torque tube and the turbine rotor disc inside the shaft can be tensioned and pull the rotor disc into compression with the torque tube. As such, an air separator can become compressed as the bolts are tightened. Thus, the tensioning of a rotor stack must be balanced with the need for adequately preloading the turbine assembly. Operation of the gas turbine engine can further add to stresses, particularly at flanges of a torque tube and a disc adapter of the coupling between the shaft and rotor disc. These stresses can result in costly and time-consuming maintenance and repair operations.

The present subject matter can help provide a solution to this problem and other problems, such as by providing a mass in the vicinity of the torque tube flange that stiffens the torque tube relative to poloidal fluctuations that can arise during operation. In particular, a stiffening mass can be positioned proximate a torque tube flange u-notch to reduce stress at the u-notch, thereby reducing the likelihood of an unscheduled outage.

In an example, a gas turbine engine rotor assembly may have a torque tube that can include a shaft extending from a forward location to an aft end, and a shaft fastening flange disposed at the aft end. A turbine stage of the rotor assembly may include a disc with a disc adapter extending forward from the disc, and a disc fastening flange extending from the disc adapter. The disk adapter may be couplable to the shaft (i.e. torque tube) fastening flange at an interface. A stiffening mass can be positioned proximate the interface to reduce operational stress in the torque tube.

In another example, a torque tube for a gas turbine engine includes a shaft extending from a forward location to an aft end with a shaft fastening flange disposed at the aft end and extending radially inward from the shaft. A notch may be located between the shaft and the shaft fastening flange, and a thickening may be added to an inner diameter surface of the shaft fastening flange to stiffen the torque tube.

In an additional example, a method of reducing operating stress in a gas turbine engine rotor assembly includes de-stacking a turbine rotor stack, separating a first stage turbine rotor disc adapter from a torque tube, attaching a stiffening mass (for example, in the shape of an annulus) to an inner diameter of one or both of the disc adapter and the torque tube, attaching the disc adapter to the torque tube, and re-stacking the turbine rotor stack.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
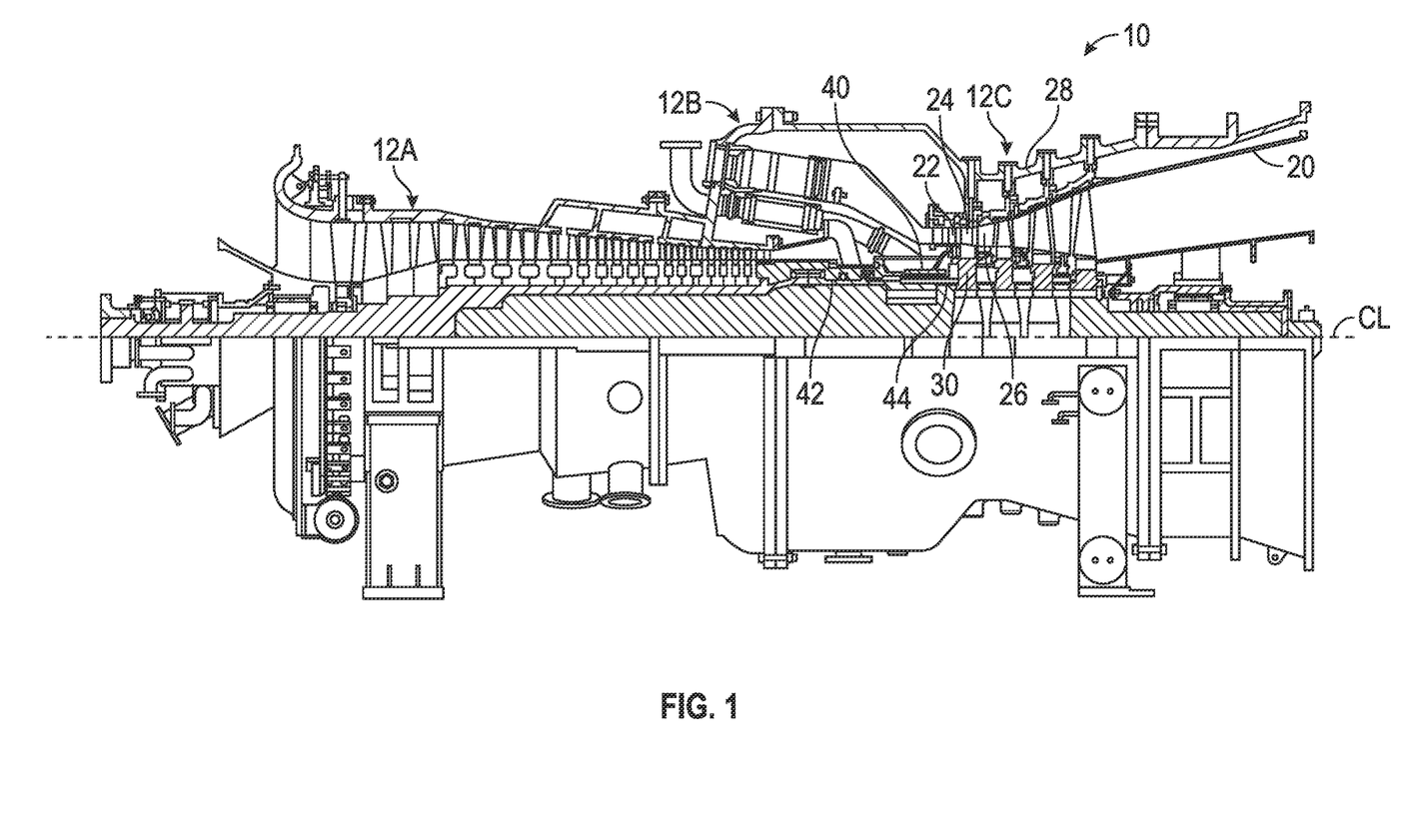
FIG. 1 is a partially broken away side view of an industrial gas turbine engine showing a compressor section, a combustor section and a turbine section of a gas generator.

FIG. 1 is a partially broken away side view of gas turbine engine 10. Gas turbine engine 10 may be coupled to a mechanical load, such as power generator to produce electricity or a pump to pump oil, gas, or other process fluid. In the illustrated example, gas turbine engine 10 is an industrial gas turbine engine circumferentially disposed about a central, longitudinal axis or axial engine centerline CL. Gas turbine engine 10 can include, in series order from front to rear, compressor section 12A, combustor section 12B, and turbine section 12C. Gas generated by gas turbine engine 10 can pass through duct 20.

As is known in the art of gas turbine engines, incoming ambient air becomes pressurized within compressor section 12A. Compressor section 12A can comprise a stack of a plurality of compressor discs each having a plurality of compressor blades. Fuel mixes with pressurized air in combustor section 12B, where it is burned. Once burned, combustion gases expand through turbine section 12C and into duct 20. Turbine section 12C can comprise a stack of a plurality of turbine discs each having a plurality of turbine blades. From duct 20, the combustion gases can flow or be directed to other components or systems, such as a heat recovery steam generator or emission treatment equipment. Turbine section 12C rotates in response to the flow of the combustion gases thereby rotating the attached compressor section 12A. Additionally, shaft power from gas turbine engine 10 can, for example, drive an electrical generator, pump, or gearbox (not shown).

Although FIG. 1 is described with reference to a single spool engine, the present disclosure may be used with multi-spool engines having multiple independent compressor and turbine sections. It is understood that FIG. 1 provides a basic understanding and overview of the various sections and the basic operation of an industrial gas turbine engine. It will become apparent to those skilled in the art that the present application is applicable to all types of gas turbine engines, including those with aerospace or aircraft applications. Similarly, although the present disclosure is described with reference to turbine rotors, the present invention is applicable to other components of gas turbine engines, such as compressor rotors, fan rotors and the like.

Turbine section 12C can comprises first stage vane 22, first stage turbine blade 24, second stage vane 26 and so forth. First stage vane 22 and second stage vane 26 can be joined to engine case 28 at their radially outer ends. First stage turbine blade 24 can be connected to first stage rotor (e.g., disc) 30 at its radially inner end. Disc adapter 44 can extend from rotor 30 to join to torque tube 42, which can be coupled to compressor section 12A. Disc adapter 44 facilitates transmission of torque from first stage turbine blade 24 and rotor 30 to torque tube 42. Air separator 40 can be mounted to the outer diameter of torque tube 42 and disc adapter 44. Air separator 40 is positioned to direct cooling air into first stage blade 24. As discussed with reference to FIG. 2, the present disclosure is directed towards features for reducing stress in torque tube 42 when rotated and subject to various stresses from disc adapter 44 and air separator 40.

Figure 2:
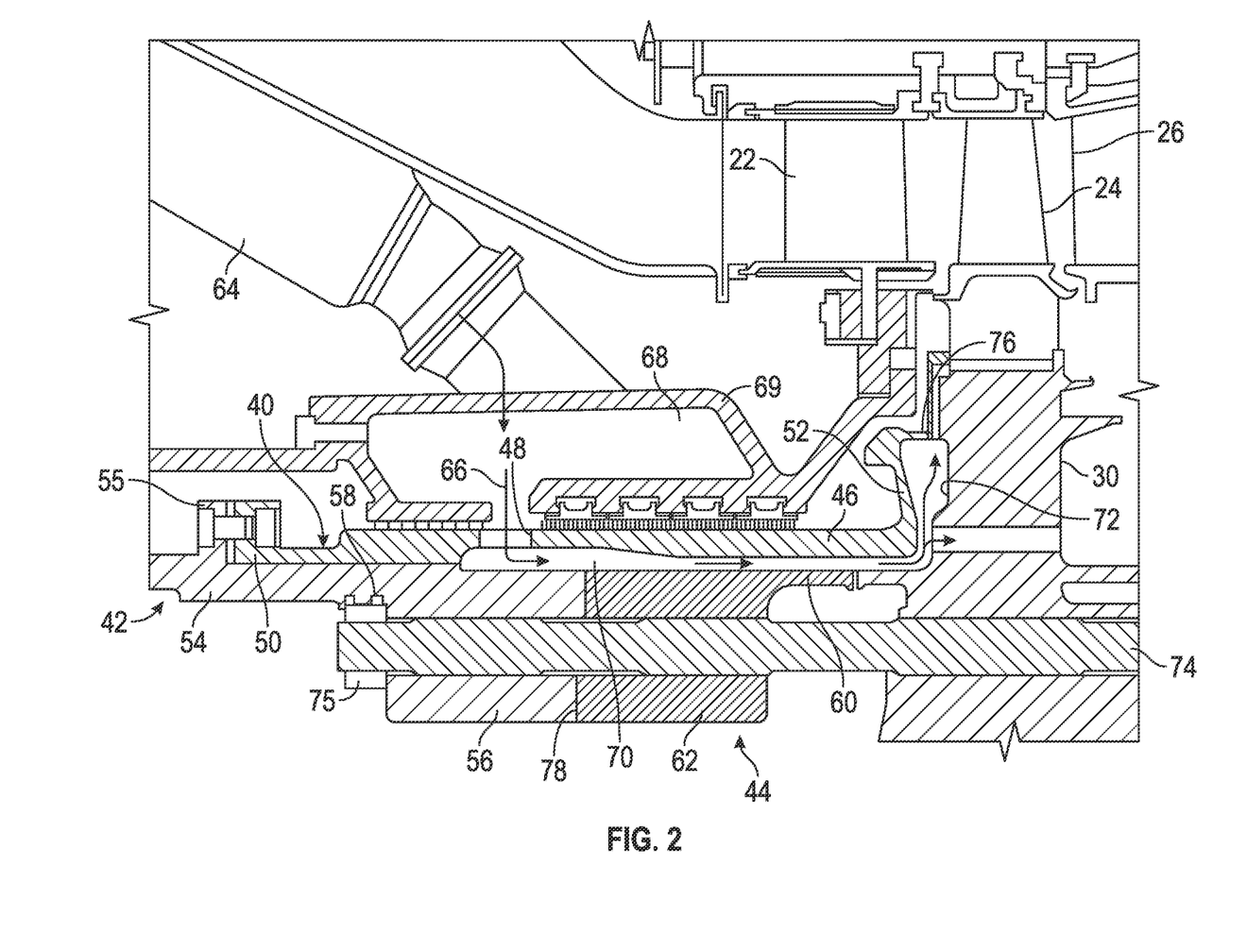
FIG. 2 is a sectional view of the turbine section of FIG. 1 showing an air separator, a disc adapter and a torque tube according to the present disclosure.

FIG. 2 is a sectional view showing air separator 40 attached to torque tube 42 and disc adapter 44 of gas turbine engine 10 according to the present disclosure. Gas turbine engine 10 comprises first stage vane 22, first stage turbine blade 24, second stage vane 26 and rotor 30, as discussed. Air separator 40 can comprise cylindrical body 46, aperture 48, forward flange 50 and goose neck 52. Torque tube 42 can comprise shaft portion 54, coupling flange 55, aft flange 56 and u-notch 58. Disc adapter 44 can comprise extension 60 and forward flange 62.

Duct 64 can be configured to feed cooling air 66 from a source within gas turbine engine 10, such as from compressor section 12A, to space 68 within torque tube cover 69. Cooling air 66 from space 68 can flow through aperture 48 in air separator 40 into space 70 between cylindrical body 46 of air separator 40 and shaft portion 54 of torque tube 42 and then up to space 72 between gooseneck 52 and rotor 30 to provide cooling to first stage blade 24. Air separator 40 is located at the outer diameter of torque tube 42 and disc adaptor 44 to conveniently take advantage of the location of air system components, such as duct 64. Air separator 40 can, however, vibrate during rotation of turbine section 12C. Such vibration, as well as the force generated by rotation of air separator 40, can induce stresses in torque tube 42.

Torque tube 42 can extend from compressor section 12A and join to turbine section 12C via coupling with disc adapter 44. Torque tube 42 can be coupled to disc adapter 44 and rotor 30, as well as other stages of turbine section 12C, via a plurality of spindle bolts 74. For example, nut 75 can abut flange 56 and a head (not shown) of a spindle bolt 74 can about the aft side of rotor 30 or another downstream rotor of turbine section 12C in the rotor stack. Thus, nut 75 can be tightened to bring torque tube 42 into compression with disc adapter 44, rotor 30 and any subsequent rotor stages. Alternatively, nut 75 can be located on the aft end of spindle bolts 74 with the head being located at the forward end.

Additionally, in order to preassemble torque tube 42 and disc adapter 44, such as before coupling with rotor 30 via spindle bolts 74, a plurality of coupling bolts 77 (FIG. 4) can be used to directly connect aft flange 56 and forward flange 62, such as without passing into rotor 30. For example, a head 79A (FIG. 4) of coupling bolt 77 can abut the forward side of flange 56 and a nut 79B (FIG. 4) can abut the aft side of flange 62 (or vice versa) to bear shear loads from flanges 56 and 62. Thus, nut 79B can be tightened to bring flange 56 directly into compression with flange 62. In an example, twelve coupling bolts 77 can be interspersed with twelve spindle bolts 74 around circumferences of flanges 56 and 62.

After coupling bolts 77 are applied, but before spindle bolts 74 are applied, air separator 40 can be attached to toque tube 42 and rotor 30. Forward flange 50 of air separator 40 can be bolted to coupling flange 55 of torque tube 42 and goose neck 52 can be force fit into engagement with rotor 30. For example, nose 76 of goose neck 52 can be pressed into engagement with a forward face of rotor 30. As such, air separator 40 can be put into compression as goose neck 52 flexes between nose 76 and cylindrical body 46, which can tend to force flanges 56 and 62 away from each other. However, spindle bolts 74 tend to put flanges 56 and 62 into compression. The combination of operational and pre-tensioning forces on torque tube 42 can generate stress in flange 56. Under-tightening of spindle bolts 74 can result in vibration of air separator 40. Over-tightening of spindle bolts 74 can unduly stress torque tube 42. Torque tube 42 can be provided with u-notch 58 located at an intersection of a surface of the shaft portion 54 and a forward face of the flange 56 to relieve stress at flange 56. However, u-notch 58 can itself become unduly stressed.

The present disclosure is directed to various systems and methods for reducing stress in torque tube 42, particularly near flange 56, such as at u-notch 58. The peak stress in u-notch 58 can be reduced by adding stiffness to the structure defined by torque tube 42 and disc adapter 44, such as proximate interface 78 between flanges 56 and 62 formed by the bolt array of spindle bolts 74 and coupling bolts 77. In examples, the stiffness of the structure can be increased by adding mass, such as in the form of added material, to the inner diameter of flanges 56 and 62, as shown in FIG. 3.

Figure 3:
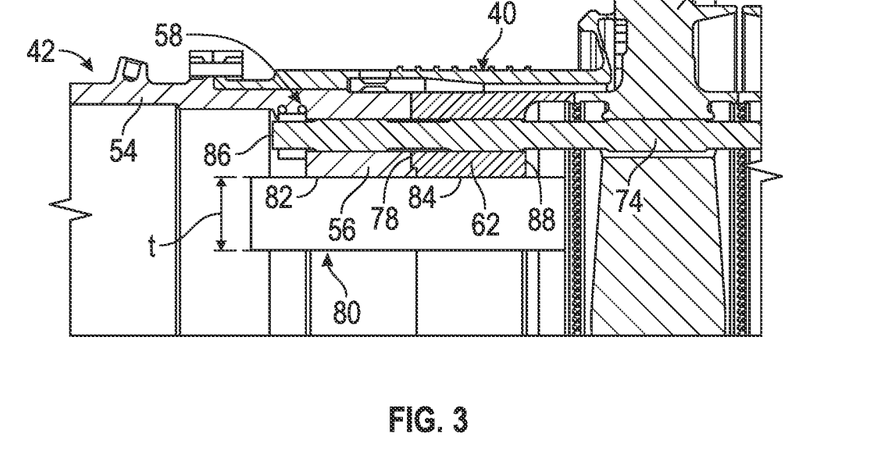
FIG. 3 is a schematic view of a zone for adding material to one or both of the torque tube and disc adapter of FIG. 2 to, for example, reduce stress in the torque tube during operation of the gas turbine engine.

FIG. 3 is a schematic view of zone 80 for adding material to one or both of torque tube 42 and disc adapter 44 of FIG. 2 to, for example, reduce stress within torque tube 42 during operation of gas turbine engine 10. Zone 80 comprises an area located at the inner diameter, relative to engine centerline CL of FIG. 1, of surfaces 82 and 84 of torque tube 42 and disc adapter 44, respectively. Location of zone 80 at the inner diameter does not interfere with placement and operation of air separator 40 at the outer diameter. Zone 80 is located proximate interface 78 and comprises a zone where placement of mass can stiffen torque tube 42 to reduce stress at u-notch 58. Zone 80 can extend forward of forward face 86 flange 56 and aft of aft face 88 of flange 62. The thickness t of zone 80 can depend on a plurality of factors, including the thicknesses of flanges 56 and 62 from an original design standpoint. The present inventors have found that stiffening torque tube 42 via placement of material in zone 80 reduces stress at u-notch 58.

The stiffness of zone 80 can be applied in a manner that balances the tradeoff between new centrifugal load and bending stiffness. The location of the new material addition in zone 80 can be applied to the inner diameter of the area adjacent to the torque tube-disc adapter interface 78. The resulting stiffer structure resists assembly and operational bending moments across LI-notch 58 better than original designs resulting in a stress level reduction, increasing the service life of torque tube 42. A comparison of original designs versus the addition of stiffening material of the present disclosure is discussed with reference to FIG. 4.

Figure 4:
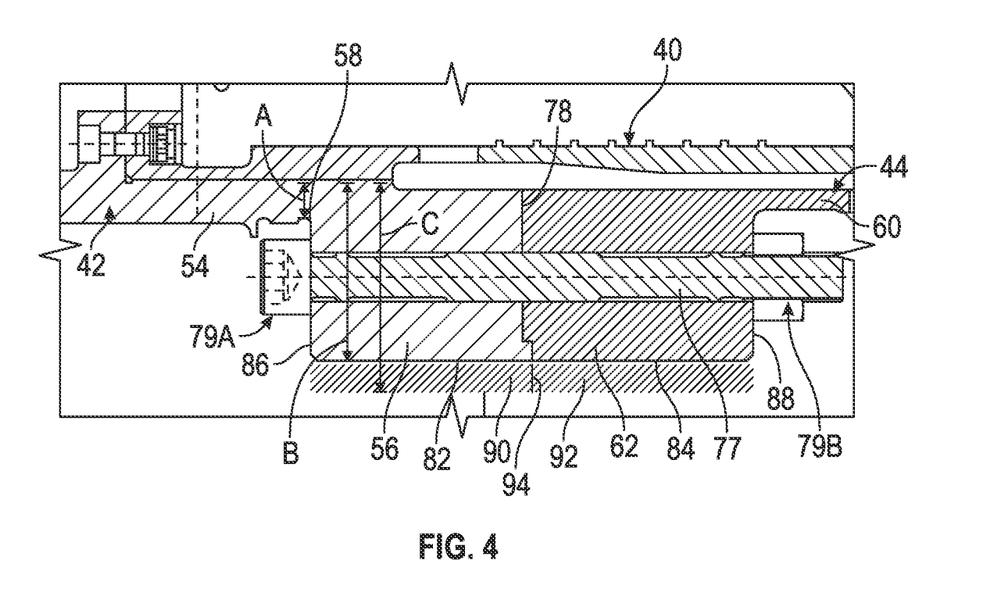
FIG. 4 is a schematic view of a first example of a torque tube and disc adapter coupling having material added to the torque tube and the disc adapter.

FIG. 4 is a schematic view of a first example of torque tube 42 and disc adapter 44 coupling at interface 78 that has material 90 and 92 added to torque tube 42 and disc adapter 44, respectively. Material 90 and 92 can comprise rings of material separate from flanges 56 and 62 that are mechanically attached or metallurgically attached. Additionally, material 90 and 92 can comprise monolithic extensions of material added to the original size of torque tube 42 and disc adapter 44 at the time of manufacture. For example, for a given gas turbine engine design, torque tube 42 can be designed to have a radial thickness A for shaft portion 54 at u-notch and radial thickness B at flange 56. Flange 62 can also have thickness B. Thicknesses B of flange 56 and 62 can be increased to radial thickness C such that the thicknesses of materials 90 and 92 can equal thickness C minus thickness B. In previous designs, thickness A has been found to be 37.6 millimeters, thickness B has been found to be 184.15 millimeters, such that the ratio of thickness A over thickness B is 20.4%. The present inventors have found that thickness B can be increased to thickness C such that thickness C is in the range of 184.15 millimeters to 384.91 millimeters and the ratio of thickness A over thickness C is in the range of 20.4% to 9.7%. The ratio stated above results in an optimal, simultaneous reduction of assembly and operational stresses.

In the example of FIG. 4, material 90 is added to inner diameter surface 82 of flange 56 and material 92 is added to inner diameter surface 84 of flange 62. Material 90 can be configured to not extend forward (to the left in FIG. 4) of face 86 of flange 56 and material 92 can be configured to not extend rearward (to the right in FIG. 4) of face 88 of flange 62. However, material 90 and material 92 need not extend all the way flush with face 86 and face 88, respectively. Materials 90 and 92 can be configured to come together at interface 94. The location of interface 94 can correspond to the axial location of interface 78, relative to centerline CL. As such, material 90 can be configured to abut material 92 when torque tube 42 is assembled with disc adapter 44.

Material 90 and 92 can be metallurgically attached, e.g., welded, to surfaces 82 and 84, respectively. For metallurgical bonding, the structures of materials 90 and 92 can be added to flanges 56 and 62 piece-wise or in segments. However, materials 90 and 92 should be added uniformly about the circumferences of flanges 56 and 62 to avoid generating vibrations. Structure for materials 90 and 92 can also be formed of rings, e.g., contiguous three-hundred-sixty-degree hoops, that are mechanically attached, e.g., force-fit or bolted, to surfaces 82 and 84. In examples, where rings of materials 90 and 92 are force-fit into engagement with surfaces 82 and 84, features can be incorporated to prevent movement of material 90 and 92. For example, materials 90 and 92 can include radially projecting flanges that could seat within radial notches in flanges 56 and 62, or vice versa, to prevent axial displacement and circumferential rotation.

Figure 5:
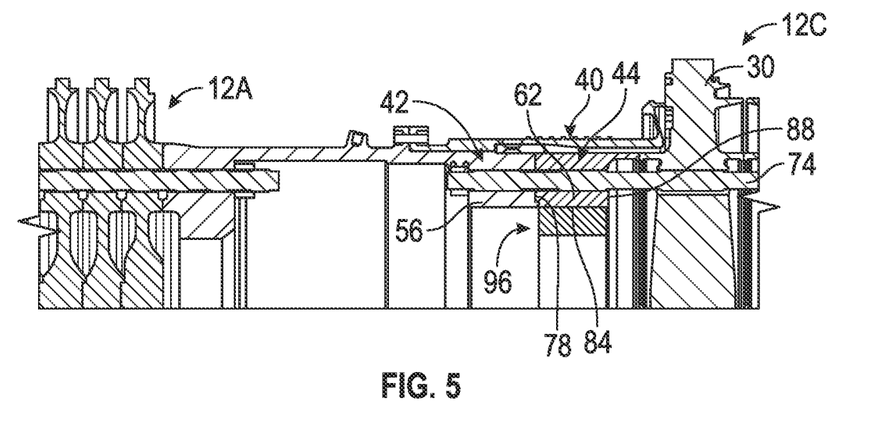
FIG. 5 is a schematic view of a second example of a torque tube and disc adapter coupling having material added to the disc adapter.

FIG. 5 is a schematic view of a second example of torque tube 42 and disc adapter 44 coupling at interface 78 that has material 96 added to disc adapter 44. Material 96 can comprise a ring of material separate from flange 62 that is mechanically attached or metallurgically attached. Additionally, material 96 can comprise a monolithic extension of material added to the original size of disc adapter 44 at the time of manufacture. The thickness of material 96 can be according to thickness C described with reference to FIG. 4.

In the example of FIG. 5, material 96 is added to inner diameter surface 84 of flange 62. Material 96 can be configured to not extend rearward (to the right in FIG. 5) of face 88 of flange 62. However; material 96 need not extend all the way flush with face 88. Material 96 can be configured to not extend forward (to the left in FIG. 5) of interface 78 and need not extend all the way flush with interface 78.

Material 96 can be metallurgically attached, e.g., welded, to surface 84. For metallurgical bonding, the structure of material 96 can be added to flange 62 piece-wise or in segments. However, material 96 should be added uniformly about the circumference of flange 62 to avoid generating vibrations. Structure for material 96 can also be formed of a ring, e.g., a contiguous three-hundred-sixty-degree hoop, that is mechanically attached, e.g., force-fit or bolted, to surface 84. In examples, where a ring of material 96 is force-fit into engagement with surface 84, features can be incorporated to prevent movement of material 96. For example, material 96 can include radially projecting flanges that could seat within radial notches in flange 62, or vice versa, to prevent axial displacement and circumferential rotation.

Figure 6:
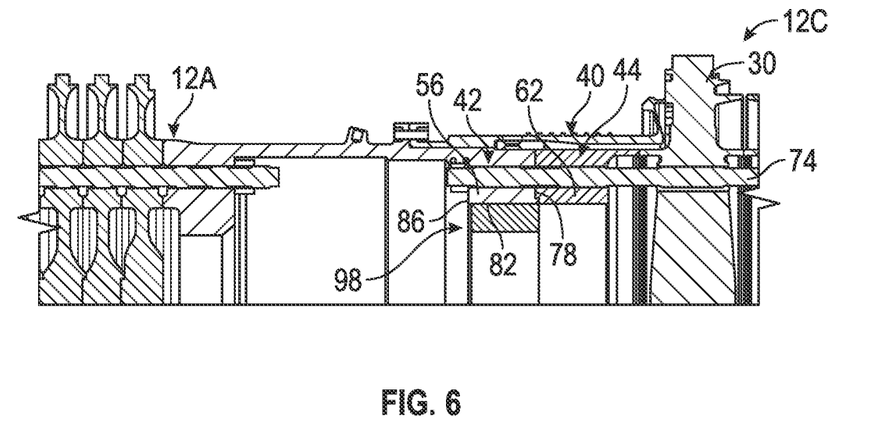
FIG. 6 is a schematic view of a third example of a torque tube and disc adapter coupling having material added to the torque tube.

FIG. 6 is a schematic view of a third example of torque tube 42 and disc adapter 44 coupling at interface 78 that has material 98 added to torque tube 42. Material 98 can comprise a ring of material separate from flange 56 that is mechanically attached or metallurgically attached. Additionally, material 98 can comprise a monolithic extension of material added to the original size of torque tube 42 at the time of manufacture. The thickness of material 98 can be according to thickness C described with reference to FIG. 4.

In the example of FIG. 6, material 98 is added to inner diameter surface 82 of flange 56. Material 98 can be configured to not extend rearward (to the right in FIG. 5) of interface 78. However, material 98 need not extend all the way flush with interface 78. Material 98 can be configured to not extend forward (to the left in FIG. 5) of face 86 and need not extend all the way flush with face 86.

Material 98 can be metallurgically attached, e.g., welded, to surface 82. For metallurgical bonding, the structure of material 98 can be added to flange 56 piece-wise or in segments. However, material 98 should be added uniformly about the circumference of flange 56 to avoid generating vibrations. Structure for material 98 can be formed of a ring, e.g., a contiguous three-hundred-sixty-degree hoop, that is mechanically attached, e.g., force-fit or bolted, to surface 82. In examples, where a ring of material 98 is force-fit into engagement with surface 82, features can be incorporated to prevent movement of material 98. For example, material 98 can include radially projecting flanges that could seat within radial notches in flange 56, or vice versa, to prevent axial displacement and circumferential rotation.

Figure 7:
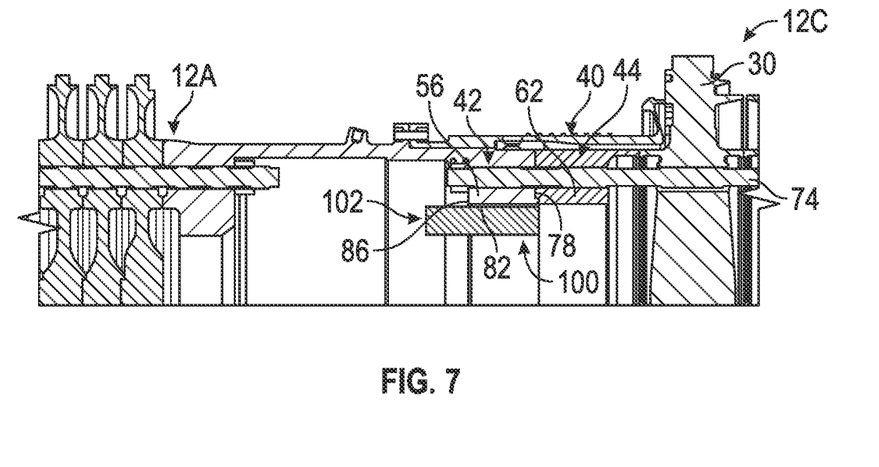
FIG. 7 is a schematic view of a fourth example of a torque tube and disc adapter coupling having material added to the torque tube with a forward overhanging portion.

FIG. 7 is a schematic view of a fourth example of torque tube 42 and disc adapter 44 coupling at interface 78 that has material 100 added to torque tube 42. Material 100 can be configured similarly as material 98 of FIG. 6. However, rather than material 100 stopping at face 86, material 100 can extend forward (to the left in FIG. 7) beyond face 86 to form cantilevered section 102. Cantilevered section 102 can be configured to extend beyond u-notch 58, that is, axially forward of u-notch 58. However, cantilevered section 102 can extend forward of flange 56, while remaining in zone 80, so as to extend beyond nut 75. The present inventors have found that placement of material forward of u-notch 58 and nut 75 can reduce stress at u-notch 58.

Additionally, although not specifically illustrated, a cantilevered section can be configured to extend from material 96 of the example of FIG. 5 aft of flange 62, as illustrated by zone 80 in FIG. 3. The present inventors have additionally found that placement of material aft of nut 79B (FIG. 4) can reduce stress at u-notch 58.

The structures forming materials 90, 92, 96, 98 and 100, whether complete three-hundred-sixty-degree rings or hoops, or individual pieces separately attached, can be fabricated of material that matches the materials of torque tube 42 and disc adapter 44, respectively. However, the material of materials 90, 92, 96, 98 and 100 can be of a different material than that of torque tube 42 and adapter 44, such as to facilitate attachment, e.g., selected for metallurgical attachment properties, selected for cost parameters, or selected for stress reducing properties. For example, a higher strength material can be used such that the thickness C can be reduced.

The present disclosure provides devices and methods that can stiffen torque tubes of existing installations in refurbishment or preventative maintenance procedures. In an exemplary method, at a first step, a gas turbine engine rotor stack can be disassembled. Air separator 40 can be removed from torque tube 42 and disc adapter 44, such as by removing fasteners from flanges 50 and 55. Nuts 75 of spindle bolts 74 can be removed so that each stage of turbine section 12C can be removed. Each rotor can be removed until rotor 30 is left. Then spindle bolts 74 can be removed. Nuts 79B of coupling bolts 77 can be removed so that rotor 30 and disc adapter 44 can be separated from torque tube 42. Then coupling bolts 77 can be removed. Finally, torque tube 42 can be removed from compressor section 12A.

At a second step, a stiffening mass can be attached to one or both of flange 56 of torque tube 42 and flange 62 of disc adapter 44. The stiffening mass can be attached anywhere within zone 80 of FIG. 3. The stiffening mass can be attached as one single structure or a plurality of structures. The stiffening mass can be attached metallurgically or mechanically. In metallurgically attached methods, the stiffening mass, can be finished, e.g., ground or polished to remove rough edges, protrusions or discontinuities. In examples, the stiffening mass can have a structure that has a rectangular cross-sectional shape similar to the cross-sectional shapes of flanges 56 and 62. However, other shaped structures can be used. After being locked into place, such as via welding or fastening, torque tube 42 and disk adapter 44 can be checked for balance. If either component is found to be unbalanced, material can be removed or added so that three-hundred-sixty-degree balance is provided.

At a third step, the gas turbine engine can be reassembled, such in the reverse order of the procedure described with reference to the first step.

The present disclosure provides solutions to stresses that can occur in torque tube 42 that can result in downtime of power plants for maintenance. The solution can be implemented in an expedient and inexpensive manner by modifying one or both of torque tube 42 and disc adapter 44 without modification of other parts. The modifications can occur to existing gas turbine engines such as by adding a stiffening ring or can occur in newly fabricated parts, such as by providing a monolithic torque tube that is thicker than previous designs. The solutions increase the life of torque tube 42 thereby reducing downtime and the costs associated therewith.

Benefits of the components, systems and methods of the present disclosure include: 1) low cost implementation, 2) increase component life, 3) low outage time to implement, 4) fast manufacturing times, 5) no torque tube cover (e.g., torque tube cover 69) modifications required, 6) no adjustments to any cooling systems (e.g., air separator 40) required, and 7) original fit and function of air separator 40, torque tube 42 and disc adapter 44 are maintained.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of reducing stresses in a gas turbine engine rotor assembly, the method comprising:
   de-stacking a turbine rotor stack;
   separating a first stage turbine rotor disc adapter from a torque tube;
   attaching a stiffening mass to an inner diameter of one or both of the disc adapter and the torque tube;
   attaching the disc adapter to the torque tube; and
   re-stacking the turbine rotor stack.

2. The method of claim 1, wherein the attaching the stiffening mass further comprises metallurgically bonding the stiffening mass to one or both of the disc adapter and the torque tube.

3. The method of claim 1, wherein the attaching the stiffening mass further comprises mechanically fastening the stiffening mass to one or both of the disc adapter and the torque tube.

4. The method of claim 1, wherein the attaching the stiffening mass to the inner diameter of one or both of the disc adapter and the torque tube comprises attaching a ring to the rotor assembly proximate an interface between the disc adapter and the torque tube.

5. The method of claim 4, wherein the attaching the ring to the rotor assembly proximate the interface comprises attaching the ring to the disc adapter and the torque tube via an interference fit.

6. The method of claim 1, wherein:
   the turbine rotor stack extends along a central longitudinal axis from a forward portion of the turbine rotor stack to an aft portion of the turbine rotor stack; and
   the torque tube comprises a shaft fastening flange extending radially inward toward the central longitudinal axis; and
   the disc adapter comprises a disc fastening flange extending radially inward toward the central longitudinal axis.

7. The method of claim 6, wherein the attaching the stiffening mass to the inner diameter of one or both of the disc adapter and the torque tube comprises positioning the stiffening mass to extend beyond a forward end of the shaft fastening flange.

8. The method of claim 6, wherein the attaching the stiffening mass to the inner diameter of one or both of the disc adapter and the torque tube comprises positioning the stiffening mass to extend beyond an aft end of the disc fastening flange.

9. The method of claim 6, wherein the attaching the stiffening mass to the inner diameter of one or both of the disc adapter and the torque tube comprises positioning the stiffening mass to be coupled to the shaft fastening flange and the disc fastening flange.

10. The method of claim 1, wherein the stiffening mass reduces operational stress by increasing rotational stiffness.

11. The method of claim 1, wherein:
    the torque tube comprises a notch between a shaft connecting the shaft fastening flange to the torque tube; and
    the stiffening mass comprises a thickening of one or both of the shaft fastening flange and the disc fastening flange.

12. The method of claim 11, wherein the thickening of one or both of the shaft fastening flange and the disc fastening flange results in a ratio of a thickness of the shaft at the notch over a thickness of one or both of the shaft fastening flange and disc fastening flange decreasing to below approximately 0.2.

13. A method of reducing stresses in a gas turbine engine rotor assembly, the method comprising:
    unbolting a disc fastening flange of a first stage turbine rotor disc adapter from a shaft fastening flange of a torque tube;
    attaching a stiffening ring to one or both of the disc fastening flange and the shaft fastening flange; and
    re-bolting the disc fastening flange and the shaft fastening flange:
    wherein:
       the gas turbine engine rotor assembly extends along a central longitudinal axis such that the disc fastening flange and the shaft fastening flange each comprise annular bodies surrounding the central longitudinal axis; and
       the stiffening ring is located at an inner diameter of one or both of the annular bodies.

14. The method of claim 13, further comprising:
    de-stacking a turbine rotor stack including the first stage turbine rotor disc adapter and the torque tube before unbolting the disc fastening flange and the shaft fastening flange; and
    re-stacking the turbine rotor stack after re-bolting the disc fastening flange and the shaft fastening flange.

15. The method of claim 13, further comprising:
    rotating the gas turbine engine rotor assembly; and
    reducing operational stress in the torque tube by increasing rotational stiffness of the torque tube with the stiffening ring.

16. The method of claim 13, wherein:
    the torque tube comprises a notch at a juncture between a shaft connecting the shaft fastening flange to the torque tube; and
    the stiffening ring results in a ratio of a thickness of the shaft at the notch over a thickness of one or both of the shaft fastening flange and disc fastening flange decreasing to below approximately 0.2.

17. The method of claim 13, wherein the attaching the stiffening ring to one or both of the disc fastening flange and the shaft fastening flange comprises positioning the stiffening ring to extend beyond a forward end of the shaft fastening flange.

18. The method of claim 13, wherein the attaching the stiffening ring to one or both of the disc fastening flange and the shaft fastening flange comprises positioning the stiffening ring to extend beyond an aft end of the disc fastening flange.

19. The method of claim 13, wherein the attaching the stiffening ring to one or both of the disc fastening flange and the shaft fastening flange comprises positioning the stiffening ring to be coupled to the shaft fastening flange and the disc fastening flange.

20. A method of reducing stresses in a gas turbine engine rotor assembly, the method comprising:
- unbolting a disc fastening flange of a first stage turbine rotor disc adapter from a shaft fastening flange of a torque tube;
- attaching a stiffening ring to one or both of the disc fastening flange and the shaft fastening flange; and
- re-bolting the disc fastening flange and the shaft fastening flange;
- wherein:
  - the torque tube comprises a notch at a juncture between a shaft connecting the shaft fastening flange to the torque tube; and
  - the stiffening ring results in a ratio of a thickness of the shaft at the notch over a thickness of one or both of the shaft fastening flange and disc fastening flange decreasing to below approximately 0.2.

* * * * *